Sept. 30, 1941.  W. L. McGRATH  2,257,471
TEMPERATURE CONTROL SYSTEM
Filed Nov. 19, 1936  2 Sheets-Sheet 2

Inventor
William L. McGrath
By George H. Fisher
Attorney

UNITED STATES PATENT OFFICE 2,257,471

TEMPERATURE CONTROL SYSTEM

William L. McGrath, Minneapolis, Minn., assignor to Minneapolis-Honeywell Regulator Company, Minneapolis, Minn., a corporation of Delaware Application November 19, 1936, Serial No. 111,694

5 Claims. (Cl. 236—91)

This invention relates to temperature control systems in general and more particularly to building temperature control systems.

It is the prime object of this invention to provide a temperature control system for a space having temperature changing means comprising a device in control of the temperature changing means for modulating the temperature changing effect thereof, controlling this device in accordance with the temperature changing effect of the temperature changing means, compensating this control by outdoor temperatures whereby the temperature changing effect of the temperature changing means may be varied in accordance with changes in outdoor temperature and further compensating this control in accordance with variations in room temperature.

It is a further object of this invention to compensate the control outlined immediately above in accordance with the average temperature of the building, which average temperature may be obtained from a plurality of points within the building.

Still another object of this invention is to provide novel electrical control systems for accomplishing the desired results.

Other objects and advantages will become apparent to those skilled in the art upon reference to the accompanying specification, claims and drawings.

Figure 1:
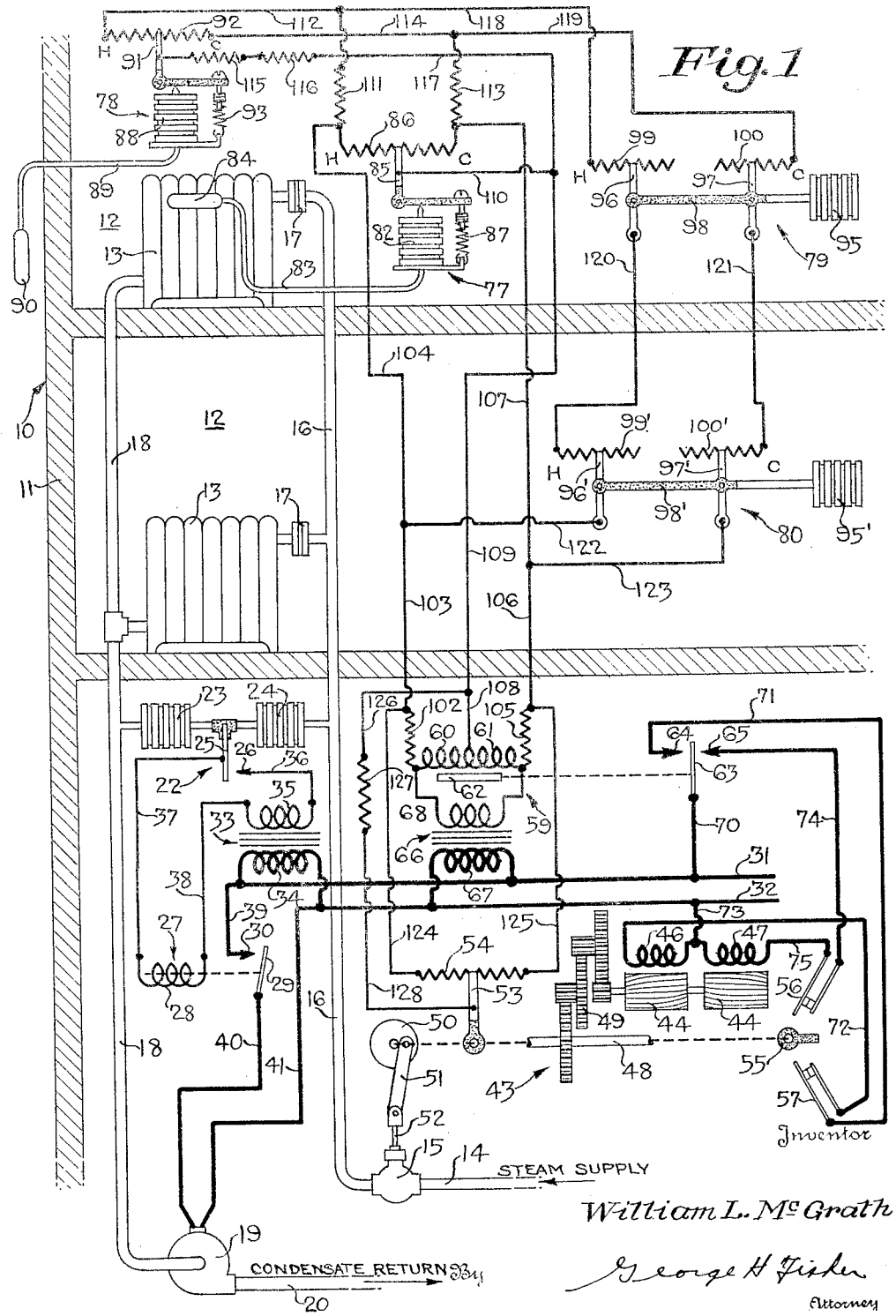
Figure 2:
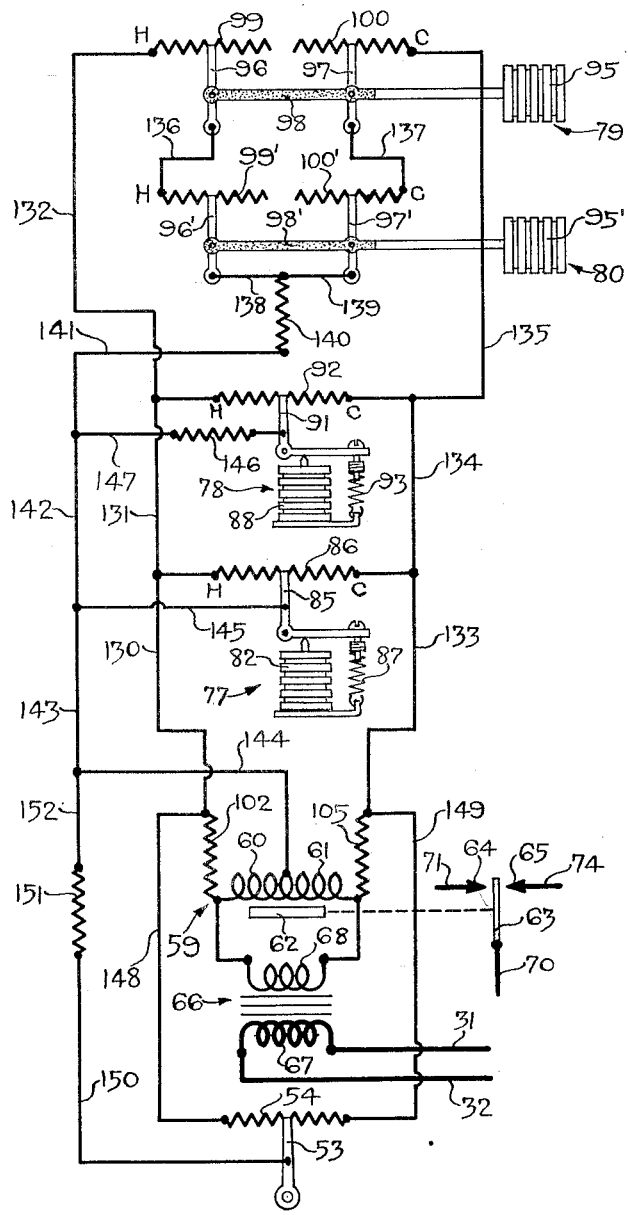

For a more thorough understanding of this invention, reference is made to the accompanying sheets of drawings in which:

Figure 1 illustrates one form of my control system as applied to a building heating system, and Figure 2 is a modified form of the control system.

Referring now to Figure 1, a building is generally designated at 10 having an outside wall 11 and a plurality of spaces, two of which are shown at 12. Located in each of the spaces are temperature changing means which are illustrated as radiators or heat exchangers 13. Temperature changing fluid which may take the form of steam is supplied to the radiators 13 by a supply pipe 14 leading from some source of steam (not shown). The supply of steam is controlled by means of a valve 15 which is connected by a riser 16 and orifices 17 to the radiators 13. Condensate is withdrawn from the radiators 13 through return riser 18 by a condensate or vacuum pump 19 and is discharged through a pipe 20.

The condensate or vacuum pump 19 may be controlled by means of a differential pressure switch, generally designated at 22. This pressure switch may include bellows 23 and 24 connected respectively to the return riser 18 and the supply riser 16. These bellows operate conjointly a switch arm 25 with respect to a contact 26. The arrangement is such that as the pressure differential decreases, the switch arm 25 is moved into engagement with contact 26. The differential pressure switch 22 operates a relay, generally designated at 27, which may comprise a relay coil 28 for operating a switch arm 29 with respect to a contact 30. The arrangement is such that when the relay coil 28 is energized, the switch arm 29 is moved into engagement with contact 30 and when the relay coil 28 is deenergized, the switch arm 29 is moved out of engagement with the contact 30 by means of springs, gravity, or other means (not shown).

Line wires leading from some source of power (not shown) are designated at 31 and 32. Power is supplied to the relay 27 by means of a step-down transformer 33 having a primary 34 connected across the line wires 31 and 32 and a secondary 35. When the pressure differential decreases to a predetermined value so as to move the switch arm 25 into engagement with contact 26, a circuit is completed from the secondary 35 through wire 36, contact 26, switch arm 25, wire 37, relay coil 28, and wire 38 back to the secondary 35. Completion of this circuit causes energization of the relay coil 28 to move the switch arm 29 into engagement with the contact 30. Movement of the switch arm 29 into engagement with the contact 30 completes the circuit from the line wire 31 through wire 39, contact 30, switch arm 29, wire 40, condensate or vacuum pump 19 and wire 41 back to the other line wire 32. This causes operation of the vacuum or condensate pump 19 to increase the differential of pressure between the supply pipe and the return pipe in order to maintain a constant differential of pressure. When the desired differential of pressure is obtained, switch arm 25 is moved out of engagement with the contact 26 to deenergize the relay 27 which, in turn, stops operation of the condensate or vacuum pump 19. In this manner, a constant pressure drop is maintained across the heating system regardless of the pressures supplied to the heating system.

In order to increase or decrease the pressure of the steam supplied to the heating system and consequently increase or decrease the heating effect thereof, the valve 15 may be operated by a proportioning or modulating motor generally designated at 43. The motor 43 may comprise rotors 44 and 45 operated by field windings 46 and 47. The rotors 44 and 45 operate a shaft 48 through a reduction gear train 49. The shaft 48 operates a crank disc 50 which is connected by a pitman 51 to the valve stem 52 of the valve 15. The shaft 48 also operates a slider 53 with respect to a potentiometer resistance 54 which performs a rebalancing function in a manner to be more fully pointed out hereafter. The shaft 48 also operates an abutment member 55 which is adapted to open limit switches 56 and 57 at the extreme ends of the travel of the motor 43. The arrangement is such that when the field winding 46 is energized, valve 15 is moved towards an open position and the slider 53 is moved towards the left with respect to the potentiometer coil 54.

The motor 43 is controlled by a normally balanced relay generally designated at 59. This relay 59 comprises series connected coils 60 and 61 for influencing an armature 62. The armature 62 operates a switch arm 63 with respect to contacts 64 and 65. Power is supplied to the relay 59 by a step-down transformer 66 having a primary 67 connected across the line wires 31 and 32 and a secondary 68. The series connected coils 60 and 61 are connected across the secondary 68. As long as the relay coils 60 and 61 are equally energized, the switch arm 63 is spaced midway between the contacts 64 and 65. When the relay coil 60 becomes more highly energized than the relay coil 61, the switch arm 63 is moved into engagement with the contact 64 to complete a circuit from the line wire 31 through wire 70, switch arm 63, contact 64, wire 71, limit switch 57, wire 72, field winding 46, and wire 73 back to the other line wire 32. Completion of this circuit causes energization of the field winding 46 to move the valve 15 towards an open position. If the valve should be moved to a complete open position, the abutment 52 opens the limit switch 57 to break the circuit to the field winding 46 to prevent overtravel of the motor. When the relay coil 61 becomes more highly energized than the relay coil 60, the switch arm 63 is moved into engagement with the contact 65 to complete a circuit from the line wire 31 through wire 70, switch arm 63, contact 65, wire 74, limit switch 56, wire 75, field winding 47, and wire 73 back to the other line wire 32. Completion of this circuit causes energization of the field winding 47 which moves the valve 15 towards a closed position and when the valve 15 has become completely closed, the limit switch 56 is opened to break the circuit through field winding 47 to prevent overtravel of the motor. From the above it is seen that when the relay coils 60 and 61 are equally energized, the motor 43 and consequently the valve 15 are held in their adjusted positions. When the relay coil 60 is energized more than the relay coil 61, the valve is moved towards an open position and when the relay coil 61 is energized more than the relay coil 60, the valve is moved towards a closed position.

The normally balanced relay 59 is controlled by a controller 77 responsive to the temperature changing effect of the radiators 13, a compensator 78 responsive to changes in outdoor temperature and compensators in the form of temperature responsive controllers 79 and 80 responsive to space temperature. The temperature responsive controllers 79 and 80 responding to space temperature at a plurality of points within the building operate in accordance with the average temperature of the building. Although I have shown only two of these space temperature responsive controllers, any number may be utilized.

The controller 77 responding to the temperature changing effect of the radiator 13 may be of the temperature responsive type and may comprise a bellows 82 connected by a capillary tube 83 to a bulb 84 located in close proximity to the radiator 13. The bulb 84 contains a volatile fluid so that when the radiator temperature increases, the bellows 82 is expanded. The bellows 82 operates a switch arm 85 with respect to a potentiometer coil 86 and the setting of the instrument may be suitably adjusted by means of the adjusting spring 87. If the radiator temperature increases, the slider 85 is moved to the left with respect to the potentiometer coil 86 in the direction indicated by the character H and when the temperature of the radiator 13 decreases, the slider 85 is moved towards the right in the direction indicated by the character C.

The compensator, generally designated at 78, comprises a bellows 88 connected by a capillary tube 89 to a bulb 90 located outside of the building. The bellows 88 operates a slider 91 with respect to a potentiometer coil 92 and the setting of the compensator 78 may be adjusted by an adjustable spring 93. The arrangement is such that as the outdoor temperature increases, the slider 91 is moved in the direction indicated by the character H, and as the outdoor temperature decreases, the slider 91 is moved in the opposite direction as indicated by the character C.

The thermostat 79 may comprise a bellows 95 containing volatile fluid which operates sliders 96 and 97 through a connecting link 98. The sliders 96 and 97 cooperate with resistances 99 and 100. The arrangement is such that as the building temperature affecting this thermostat increases, sliders 96 and 97 are moved to the left in the direction indicated by the character H and as the temperature decreases, the sliders 96 and 97 are moved to the right in a direction indicated by the character C. The building thermostat 80 which responds to the temperature of the building at a different point is in all respects similar to the building thermostat 79 and like reference characters primed have been used to show the construction of this thermostat.

The outer end of the relay coil 60 is connected by a protective resistance 102 and wires 103 and 104 to the lefthand end of the potentiometer coil 86. In like manner, the outer end of the relay coil 61 is connected by a protective resistance 105 and wires 106 and 107 to the right-hand end of the potentiometer coil 86. The junction of the relay coils 60 and 61 is connected by wires 108, 109 and 110 to the slider 85. By reason of these connections, it is seen that the potentiometer of the controller 77 is connected in parallel with the series connected coils 60 and 61. The left-hand end of the potentiometer coil 86 is connected by a resistance 111 and a wire 112 to the left-hand end of the potentiometer coil 92. In like manner, the right-hand end of the potentiometer coil 92. In like manner, the right-hand end of the potentiometer coil 86 is connected by a resistance 113 and a wire 114 to the right-hand end of the potentiometer coil 92. The slider of the compensator 78 is connected by a resistance 115, a resistance 116 and a wire 117 to the junction of wires 109 and 110. From the above, it is seen that the potentiometer of the compensator 78 is connected in parallel with the potentiometer of the conroller 77 but the resistances 111, 113, 115 and 116 are included in these connections.

The resistance 111 is connected by a wire 118 to the resistance 99 and the slider cooperating therewith is connected by a wire 120 to resistance 99'. The slider 96' is connected by a wire 122 to the junction of wires 103 and 104. In a like manner, the resistance 113 is connected by a wire 119 to the resistance 100 and the slider 97 cooperating therewith is connected by a wire 121 to the resistance 100'. The slider 97' is connected by a wire 123 to the junction of wires 106 and 107. In this manner, the variable resistances 99 and 99' are connected in parallel with the fixed resistance 111 and the variable resistances 100 and 100' are connected in parallel with the fixed resistance 113. The left-hand end of the balancing potentiometer coil 54 is connected by a wire 124 to the protective resistance 102 and in a like manner, the right-hand end of the balancing potentiometer coil 54 is connected by a wire 125 to the protective resistance 105. The junction of relay coils 60 and 61 are connected to the slider 53 of the balancing potentiometer by wires 108 and 126, resistance 127 and wire 128.

With the parts in the position shown in the drawing, sliders 91, 85, 96, 97, 96', 97' and 53 are all located in the mid position with respect to their cooperating resistances. The relay coils 60 and 61 are, therefore, equally energized and, consequently, the switch arm 63 is in a mid position with respect to its contacts 64 and 65, the motor 43 is stationary, and the valve 15 is in a half-open position whereby a predetermined amount of steam is being supplied to the radiators 13. If the temperature changing effect of the radiators should decrease, that is, if the radiators should cool, the slider 85 is moved towards the right with respect to the potentiometer coil 86 to partially short-circuit the relay coil 61 to decrease the energization thereof and increase the energization of the relay coil 60. This causes movement of the valve 15 towards an open position to supply additional steam to the radiators 13. Movement of the valve 15 towards an open position causes left-hand movement of the slider 53 with respect to the balancing potentiometer coil 54 to partially short-circuit the relay coil 60 and when the slider 53 has moved sufficiently far to the left to rebalance the energizations of the coils 60 and 61, the motor is stopped and the valve is maintained in the new position which supplies the correct amount of steam to the radiators 13. Conversely, if the temperature changing effect of the radiators 13 increases, the slider 85 is moved to the left to partially short-circuit the relay coil 60 to decrease the energization thereof and increase the energization of the relay coil 61. This causes movement of the valve 15 towards a closed position and right-hand movement of the slider 53 with respect to the balancing potentiometer coil 54. This movement of the slider 53 causes partial short-circuiting of the relay coil 61 to decrease the energization thereof and increase the energization of the relay coil 60. When the energizations of the relay coils 60 and 61 become equal, switch arm 63 is moved to the mid position, the motor 43 is stopped, and the valve 15 is held in its newly adjusted position. In this manner, the temperature changing effect of the radiators 13 is maintained substantially constant.

If the outdoor temperature decreases, the slider 91 is moved to the right to partially short-circuit the relay coil 61 to decrease the energization thereof and increase the energization of the coil 60. This causes movement of the valve 15 towards an open position. Conversely, if the outdoor temperature increases, the slider 91 is moved towards the left and the relay coil 60 is partially short-circuited to decrease the energization thereof and increase the energization of the relay coil 61. This causes movement of the valve 15 towards an open position. Since both of the potentiometers of the controller 77 and the compensator 78 are connected in parallel with each other and in parallel with the series connected coils 60 and 61, the series connected coils 60 and 61 are controlled by the conjoint action of these two potentiometers to maintain predetermined radiator temperatures which are adjusted or varied in accordance with outdoor temperatures. Specifically, as the outdoor temperature decreases, the radiator temperatures increase and as the outdoor temperature increases the radiator temperatures decrease. By suitably adjusting these controllers as to their temperature settings and range of movements, a predetermined schedule may be obtained with respect to radiator temperatures and outdoor temperatures wherein for any given outdoor temperature the radiator temperature will assume a given value.

As pointed out above, the fixed resistance 111 is connected in series with the left-hand end of the potentiometer coil 92 and the resistance 113 is connected in series with the right-hand end of the potentiometer coil 92. Therefore, these resistances 111 and 113 may be considered as being part of the potentiometer coil 92, which parts are not adapted to be wiped by the slider 91. As pointed out above, the variable resistances 99 and 99' are connected in parallel with the resistance 111 and the variable resistances 100 and 100' are connected in parallel with the resistance 113. Therefore, the resistances 111, 99 and 99' are connected in series with the left-hand end of the coil 92 and the resistances 113, 100 and 100' are connected in series with the right-hand end of the coil 92.

Upon a decrease in room temperature affecting the room thermostat 79, the sliders 96 and 97 are moved to the right in a direction indicated by the character C and this movement decreases the resistance in series with the right-hand end of the potentiometer coil 92 and increases the resistance in series with the left-hand end of the potentiometer coil 92. This has the same effect as sliding the slider 91 to the right with respect to the potentiometer coil 92 and, therefore, the relay coil 61 is partially short-circuited to decrease the energization thereof and to increase the energization of the relay coil 60. This causes movement of the valve 15 toward an open position in proportion to the amount of partial short-circuiting. Likewise, if the sliders 96 and 97 of the room thermostat 79 are moved to the left upon an increase in space temperature, the amount of resistance in series with the left-hand end of the potentiometer coil 92 is decreased and the amount of resistance in series with the right-hand end thereof is increased and this has the same effect as moving the slider 91 to the left with respect to the potentiometer coil 92. This causes partial short-circuiting of the relay coil 60 to decrease the energization thereof and to increase the energization of relay coil 61 whereby the valve 52 is moved toward a closed position. The same mode of operation is accomplished by the room thermostat 80 responding to the temperature of the building at a different point. Since the room thermostats 79 and 80 are connected in series, these thermostats reflect the average temperature of the building, and therefore the valve 15 is also positioned in accordance with the average temperature of the building. From the above, it is seen that the schedule of radiator temperatures and outdoor temperatures is modified as the average building temperature varies from the desired normal value. More specifically, for a given outdoor temperature, the radiator temperature is increased as the building temperature decreases and, conversely, the radiator temperature is decreased as the building temperature increases. Therefore, the valve 15, which controls the supply of steam to the building, is operated in accordance with a modified schedule which is formulated in accordance with radiator temperature, outdoor temperature and the average temperature of the building. By reason of this control system, the building temperature is maintained at a closer value than has been possible in the past.

The resistances 115 and 127 which are connected respectively to the sliders 91 and 53 are included in this electrical system to desensitize the controlling effect of the compensator 78 and the rebalancing effect of the balancing potentiometer operated by the motor 43. Therefore, the controller 77 responsive to radiator temperatures becomes the most sensitive whereby the main controlling function is performed by the radiator temperature responsive controller 77, which controlling effect is compensated or adjusted by the outdoor controller 78 and the room thermostats 79 and 80. The variable resistance 116 connected to the slider 91 is of such value as to balance out the effect of the resistances 111, 113 and the resistances 99, 100, 99' and 100' when their sliders 96, 97, 96' and 97', respectively, are in the mid position. Therefore, with sliders 96, 97, 96', and 97' in the mid position, the resistances controlled thereby and the resistances 111 and 113 have no effect upon the operation of the valve 15, the valve 15 being controlled solely by the effect of the main controller 77 responsive to radiator temperatures and the compensator 78 responsive to outdoor temperatures. However, when the sliders 96, 97, 96' and 97' of the room thermostats 79 and 80 deviate from their mid positions, the effect of the resistances 111, 113 and the resistance controlled by these sliders is felt and the schedule is modified in accordance with room temperatures.

Referring now to Figure 2, I have shown a modified form of the control system for accomplishing substantially the same results as are accomplished in Figure 1. This control system of Figure 2 is to be utilized for operating the proportioning motor 43 of Figure 1 for controlling the valve 15, the balancing potentiometer of the proportioning motor being shown at the bottom of Figure 2. Figure 2 utilizes the same normally balanced relay 59, the same main controller 77 responsive to radiator temperatures, the same compensator 78 responsive to outdoor temperatures and the same room thermostats 79 and 80 responsive to building temperatures. However, the manner in which these instruments are connected together is slightly different.

The relay coil 60 is connected by the protective resistance 102 and wires 130, 131 and 132 to the left-hand ends of the potentiometer coils 86 and 92 and to the left-hand end of the variable resistances 99. The right-hand end of the relay coil is connected by the protective resistance 105, and wires 133, 134, and 135 to the right-hand ends of the potentiometer coils 86 and 92 and the variable resistance 100. The sliders 96 and 97 are connected by wires 136 and 137, respectively, to the variable resistances 99' and 100'. Sliders 96' and 97' are connected by wires 138 and 139, resistance 140, and wires 141, 142, 143, and 144 to the junction of the relay coils 60 and 61. The slider 85 of the controller 77 is connected to the junction of the coils 60 and 61 by wire 145 and the slider 91 of the compensator 78 is connected by a resistance 146 and a wire 147 to the junction of coils 60 and 61. The left and right ends of the balancing potentiometer coil 54 are connected to the protective resistances 102 and 105 by wires 148 and 149, respectively. The slider 53 of the balancing potentiometer is connected by a wire 150, a resistance 151 and a wire 152 to the junction of wires 143 and 144. From the above, it is seen that the resistances 99 and 99' are connected in series, that the resistances 100 and 100' are connected in series, that these series connected resistances, the control potentiometer of the controller 77, the compensating potentiometer of the compensator 78, and the balancing potentiometer operated by the motor 43 are all connected in parallel with the series connected relay coils 60 and 61.

By reason of the above parallel relationship, movement of any of the sliders 96, 97, 96', 97', 91 or 85 to the right causes partial short-circuiting of the relay coil 61 to decrease the energization thereof and to increase the energization of the relay coil 60 to cause movement of the valve 15 towards an open position in an amount proportional to the movement of the sliders. Likewise, movement of any of these sliders to the left in the direction indicated by the character H causes partial short-circuiting of the relay coil 60 to decrease the energization thereof and to increase the energization of the relay coil 61 to cause movement of the valve 15 towards a closed position to decrease the supply of heat to the building. The resistances 140, 146, and 151 are utilized for desensitizing the controllers with which they are connected whereby the controller 77 responsive to radiator temperatures becomes the main controller and performs the main controlling function and the compensator 78 and the room thermostats 79 and 80 become secondary in function to compensate the controlling effect of the main controller 77. Therefore, in this modification, as in the previous modifications, a schedule may be formulated for controlling the valve 15 in accordance with radiator temperatures and outdoor temperatures to cause the radiator temperature to increase as the outdoor temperature decreases, which schedule may be modified by room temperatures to cause the radiator temperatures to increase as the building temperature decreases.

Although I have shown the main controller 77, which responds to the heating effect or the temperature changing effect of the radiators 13, to be a temperature responsive controller, this controller 77 may be of any type, such as a pressure responsive controller responsive to the pressures in the heating system. Such a controller would respond to the heating effect of the heating system and the use of such a controller is within the contemplation of this invention.

Although for purposes of illustration, I have shown two forms of my invention, other forms thereof may become obvious to those skilled in the art and, therefore, this invention is to be limited only by the scope of the appended claims and the prior art.

I claim as my invention:

1. In a temperature control system for a building, the combination of, temperature changing means for the building, control means for the temperature changing means, relay means for controlling the control means and including series connected relay coils connected across a source of electrical energy, an adjustable potentiometer including a resistance and a slider, means responsive to the temperature changing effect of the temperature changing means for adjusting the adjustable potentiometer, means connecting the ends of said resistance with the remote ends of said series connected coils, means connecting the slider with the adjacent ends of the series connected coils, a second adjustable potentiometer including a resistance and a slider, means responsive to temperature conditions outside of said building for adjusting the second adjustable potentiometer, connections between the ends of the resistance of the second potentiometer and the remote ends of the relay coils and a connection between the slider of the second potentiometer and the adjacent ends of the series connected coils, variable resistances in series only with the connections between the series connected coils and the ends of the resistance of the second adjustable potentiometer, and means responsive to the temperature of the building for adjusting said variable resistances.

2. In a temperature control system for a building, the combination of, temperature changing means for the building, control means for the temperature changing means, relay means for controlling the control means and including series connected relay coils connected across a source of electrical energy, an adjustable potentiometer including a resistance and a slider, means responsive to the temperature changing effect of the temperature changing means for adjusting the adjustable potentiometer, means connecting the ends of said resistance with the remote ends of said series connected coils, means connecting the slider with the adjacent ends of the series connected coils, a second adjustable potentiometer including a resistance and a slider, means responsive to temperature conditions outside of said building for adjusting the second adjustable potentiometer, connections between the ends of the resistance of the second potentiometer and the remote ends of the relay coils and a connection between the slider of the second potentiometer and the adjacent ends of the series connected coils, a resistance element in series only with each of the connections between the ends of the resistance of the second potentiometer and the remote ends of the series connected coils, a plurality of variable resistances in shunt with each of said resistance elements, and means responsive to the temperature in various portions of the building for adjusting the different variable resistances.

3. In a control system, the combination of a device to be controlled, a source of electrical energy, a relay for controlling the operation of the device and including a pair of series connected coils connected across said source, a pair of adjustable potentiometers, each including a resistance and a slider, means electrically connecting the ends of the resistances and the remote ends of the series connected coils, means connecting the sliders and the adjacent ends of the series connected coils, a plurality of variable resistances in each of the connecting means between the remote ends of the series connected coils and the ends of the resistance of one of the potentiometers only, and additional resistance means connected in parallel with the group of variable resistances in each of the connecting means.

4. In a control system, the combination of a device to be controlled, a source of electrical energy, a relay for controlling the operation of the device and including a pair of series connected coils connected across said source, a pair of adjustable potentiometers, each including a resistance and a slider, means electrically connecting the ends of the resistances and the remote ends of the series connected coils, means connecting the sliders and the adjacent ends of the series connected coils, a plurality of variable resistances in each of the connecting means between the remote ends of the series connected coils and the ends of the resistance of one of the potentiometers only, additional resistance means connected in parallel with the group of variable resistances in each of the connecting means, and resistance means in the circuit to the slider of said one potentiometer to counterbalance the effect of the resistances in the means connecting the ends of the resistance of said one potentiometer and the remote ends of the series connected coils and to desensitize the effect of said one potentiometer on the relay.

5. In a temperature control system for a multi-zone building; the combination of heating means for the building, control means for the heating means; relay means for controlling the control means and including coil means; a plurality of adjustable resistance devices each including a resistor and a slider; means responsive to the heating effect of said heating means for adjusting a first of said resistance devices, means responsive to temperature conditions outside of said building for adjusting a second of said resistance devices; means connecting a plurality of the remaining resistance devices in series; means in each zone responsive to the temperature of that zone for adjusting one of said series connected resistance devices; means responsive to the position of said control means for adjusting a further of said resistance devices; a control circuit including said relay coil means, said plurality of control devices including said series connected resistance devices, and a source of power whereby said control means is positioned in accordance with the resultant of the heating effect of said heating means, the temperature conditions outside of said building, and the average temperature in said plurality of zones; and means associated with said control circuit for decreasing the effect of said second device; said series connected devices, and said further resistance device with respect to said first resistance device to such an extent that a small adjustment of said first resistance device will cause said device to be moved the full range of movement of said control means corresponding to the range of adjustment of said further resistance device.

WILLIAM L. McGRATH.